US012756095B2

(12) United States Patent
Mercier et al.

(10) Patent No.: US 12,756,095 B2
(45) Date of Patent: Oct. 6, 2026

(54) PHASE SHIFT UNIT CELL ARRAY FOR A TRANSMIT-ARRAY ANTENNA AND ASSOCIATED MANUFACTURING METHOD

(71) Applicant: COMMISSARIAT A L'ENERGIE ATOMIQUE ET AUX ENERGIES ALTERNATIVES, Paris (FR)

(72) Inventors: Denis Mercier, Grenoble Cedex (FR); Marjolaine Allain, Grenoble Cedex (FR); Antonio Clemente, Grenoble Cedex (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 52 days.

(21) Appl. No.: 19/040,519

(22) Filed: Jan. 29, 2025

(65) Prior Publication Data

US 2025/0246807 A1 Jul. 31, 2025

(30) Foreign Application Priority Data

Jan. 30, 2024 (FR) ....................................... 2400889

(51) Int. Cl.
*H01Q 3/30* (2006.01)
*H01Q 21/00* (2006.01)
*H01Q 21/06* (2006.01)

(52) U.S. Cl.
CPC ........... *H01Q 3/30* (2013.01); *H01Q 21/0087* (2013.01); *H01Q 21/065* (2013.01)

(58) Field of Classification Search
CPC ..... H01Q 3/30; H01Q 21/0087; H01Q 21/065
See application file for complete search history.

(56) References Cited

FOREIGN PATENT DOCUMENTS

| | | | |
|---|---|---|---|
| FR | 2 847 718 | A1 | 5/2004 |
| JP | 2012-257315 | A | 12/2012 |

OTHER PUBLICATIONS

French Preliminary Search Report & Written Opinion Issued Sep. 11, 2024 in French Application No. 2400889 filed on Jan. 30, 2024 (with English Translation of Categories of Cited Documents), 10 pages.
Gharbieh, S. et al., "Phase Change Material Based Reconfigurable Transmitarray: a Feasibility Study", IEEE, 16th European Conference on Antennas and Propagation (EUCAP), European Association for Antennas and Propagation, XP034122335, 2022, 4 pages.
Bowrothu, R. et al., "3D Integrated Through Fused Silica Via (TFV) Based Array Antenna for mm Wave Communications", IEEE 70th Electronic Components and Technology Conference (ECTC), 2020, 1 page, abstract only.

(Continued)

*Primary Examiner* — Graham P Smith
(74) *Attorney, Agent, or Firm* — Oblon, McClelland, Maier & Neustadt, L.L.P.

(57) ABSTRACT

A transmit-array and/or reflect-array antenna, configured to operation in sub-terahertz frequency bands and its manufacturing method. The antenna may include a phase shift unit cell array for a transmit-array antenna having a first substrate on which is fixed by pieces, or equivalently by tiles, a second substrate in which the pieces or tiles have been cut. Thus, the flatness stresses of the assembly surfaces are relaxed, and/or the risk of substrates breaking during their handling is decreased.

16 Claims, 10 Drawing Sheets

(56) References Cited

OTHER PUBLICATIONS

Cheng, C-C., "A Programmable Lens-Array Antenna With Monolithically Integrated MEMS Switches", IEEE Transactions on Microwave Theory and Techniques, vol. 57, Issue 8, 2009, 1 page, abstract only.
Elkhouly, M. et al., "D-band Phased-Array TX and RX Front Ends Utilizing Radio-on-Glass Technology", IEEE Radio Frequency Integrated Circuits Symposium (RFIC), 2020, 1 page, abstract only.
Elkhouly, M. et al., "Fully Integrated 2D Scalable TX/RX Chipset for D-Band Phased-Array-on-Glass Modules", IEEE International Solid-State Circuits Conference (ISSCC), 2022, 1 page, abstract only.
Kim, H-I., "Highly Energy Efficient 64-element Array Antenna Based on Cu/Co Metaconductor and Fused Silica", IEEE Wireless and Microwave Technology Conference (WAMICON), 2023, 1 page, abstract only.
Koutsos, O. et al., "High-resolution quartz transmitarray antenna for sub-THz applications", IEEE International Symposium on Antennas and Propagation and USNC-URSI Radio Science, 2022, 3 pages.
Pahlavan, P. et al., "Metamaterial Based Compact Patch Antenna Array for Antenna-in-Package Solutions in Frequency Handover Applications", IEEE 73rd Electronic Components and Technology Conference (ECTC), 2023, 6 pages.
Peng, K., "A Sub-THz Reconfigurable Transmitarray using Quartz Glass and GaAs Schottky Diode", IEEE Conference on Antenna Measurements and Applications (CAMA), 2022, 1 page, abstract only.
Wu, Y., "A W-Band Corporate-Fed Hollow-Waveguide Slot Array Antenna by Glass Micromachining", Proceedings of ISAP2020, IEICE, 2021, 2 pages.

PHASE SHIFT UNIT CELL ARRAY FOR A TRANSMIT-ARRAY ANTENNA AND ASSOCIATED MANUFACTURING METHOD

TECHNICAL FIELD

The present invention relates to a transmit-array antenna and/or reflect-array antenna, intended to operate in sub-terahertz frequency bands, for example, around one or more hundred gigahertz. The present invention relates more specifically to a phase shift unit cell array for a transmit-array antenna and its manufacturing method. The invention has, for example, to be applied in medical imaging and industrial control, Earth and deep space observation, as well as for radars and broadband telecommunication systems.

PRIOR ART

In reference to accompanying FIG. 1, a transmit-array antenna makes it possible to focus or to form, in the general case, the radiation diagram of a so-called focal source exciter antenna. A phase law, and optionally amplitude law, is generated on the surface of the transmit-array, in order to transform the incident fields into a desired wavefront. Transmit-arrays are composed of several discrete elements called elementary or unit cells. They are generally square and make it possible, through their number, their distribution and their phase and amplitude response, to control the distribution of the radiated field. Each unit cell is composed of an element or receiver patch placed on the surface facing the focal source and sender element or patch placed on the opposite surface. Phase shifts are applied to the unit cells, between the elements on the receiver and transmission surfaces, to focus the incident wavefronts coming from the feed antenna. The primary focal source being able to be a cornet (single source) or a compact antenna array. The transmission array being presented in the form of a phase shift cell matrix is intended to form at least one part of the antenna, even a reconfigurable phased array antenna, with the primary source associated with it.

Most transmit-array antennas at sub-THz frequencies are today obtained by implementations of manufacturing methods, which consist of transferring a first section (or wafer) of a substrate which can be made of glass, silicon or other materials used in microelectronics on at least one second section or wafer of a substrate made of a material which can be identical or different from the first. Most of the time, this substrate assembly comprises a metal layer on each of its 2 faces and at least one between the 2 substrates. Each of these layers can be etched to form patterns such as patches or radiating elements on the surfaces. The patches or radiating elements of a surface are considered as the receiver elements, and those of the second surface as the sender elements. Each receiver element can optionally be connected to each sender element by at least one metal via passing through the substrates to form an elementary phase shift cell.

For example, the following three scientific documents are based on this type of so-called wafer-to-wafer assembly:

S. Gharbieh, A. Clemente, J. Milbrandtand B. Reig, "Phase Change Material Based Reconfigurable Transmitarray: a Feasibility Study," 2022 16*th European Conference on Antennas and Propagation* (*EuCAP*), Madrid, Spain, 2022, pp. 1-4, doi: 10.23919/EuCAP53622.2022.9769642;

H.-I. Kim, A. Wilcher, W. Lee, S. Nelson and Y.-K. Yoon, "Highly Energy Efficient 64-element Array Antenna Based on Cu/Co Metaconductor and Fused Silica," 2023 IEEE Wireless and Microwave Technology Conference (WAMICON), Melbourne, FL, USA, 2023, pp. 137-139, doi: 10.1109/WAMICON57636.2023.10124910; and.

R. Bowrothu, H. Kim, Y. K. Yoon and S. Schmidt, "3D Integrated Through Fused Silica Via (TFV) Based Array Antenna for mm Wave Communications," 2020 IEEE 70th Electronic Components and Technology Conference (ECTC), Orlando, FL, USA, 2020, pp. 95-100, doi: 10.1109/ECTC32862.2020.00028.

These solutions have, like a lot of other manufacturing methods, the disadvantage of involving handling two sections, which are relatively thin, for relatively large diameters, from which assembly difficulties and risks of damaging the at least one of the two sections arise. Due to the thermal dilation coefficients, which are very different from one another, of the materials used, it is difficult to use standard microelectronic manufacturing methods for bonding substrates to one another; the latter requiring temperatures greater than 250° C., the mechanical stresses generated by the temperature increase lead to potentially breaking the wafers.

An aim of the present invention is to overcome at least one of the disadvantages of the prior art, preferably by preserving the advantages that it has.

SUMMARY

To achieve this aim, according to a first aspect of the invention, a phase shift unit cell array for a transmit-array antenna is provided, comprising:

- a first substrate with the basis of one or the other from among molten silica, quartz and a glass having a loss tangent less than 0.005 at frequencies greater than 100 GHz, and comprising vias through the first substrate,
- at least two tiles, for example coming from a cutting in a second substrate with the basis of one or the other from among molten silica, quartz and a glass having a loss tangent less than 0.005 at frequencies greater than 100 GHz, and each comprising at least one via through the tile,
- three metallisation levels, of which a first metallisation level located under the first substrate, a second metallisation level located on each tile and a third metallisation level located between each tile and the first substrate, each tile being fixed on the first substrate to form a phase shift unit cell of the phase shift unit cell array, at least one via through each tile being associated with one of the vias through the first substrate by being located to the right of one another, and the vias associated with one another interconnecting the three metallisation levels with one another, and each tile being able to have a different thickness.

According to a second aspect, a transmit-array antenna comprising a phase shift unit cell array such as introduced above and a primary source connected electromagnetically, to said phase shift unit cell array are provided.

According to a third aspect, a method for manufacturing a phase shift unit cell array for a transmit-array antenna is provided, comprising:

- providing a first substrate with the basis of one or the other from among molten silica, quartz and a glass having a loss tangent less than 0.005 at frequencies greater than 10 GHz, and comprising vias through the first substrate,
- providing a second substrate with the basis of one or the other from among molten silica, quartz and a glass having a loss tangent less than 0.005 at frequencies greater than 100 GHz, and comprising vias through the second substrate, providing a first metallisation level located under the first substrate and a first half of a third metallisation level located on the first substrate, providing a second metallisation level located on the second substrate and a second half of the third metallisation level located under the second substrate, then.

cutting at least one first tile in the second substrate, said at least one first tile comprising at least one of the vias of the second substrate, transferring said at least one first tile on the first substrate, such that at least one via through each first tile is associated with one of the vias through the first substrate, by being located to the right of one another, and such that the vias associated with one another interconnect the three metallisation levels to one another.

The invention according to each of its different aspects can thus consist of, or result in, a first substrate on which is fixed by pieces, or equivalently by tiles, a second substrate in which the pieces or tiles have been cut. Thus, the flatness stresses of the assembly surfaces are relaxed, and/or the risk of substrates breaking is decreased during their handling and/or their manufacture, when they are subjected to thermomechanical stresses.

BRIEF DESCRIPTION OF THE FIGURES

The aims, objectives, as well as the features and advantages of the invention will best emerge from the detailed description of an embodiment of the latter which is illustrated by the following accompanying drawings, in which.

Figure 1:
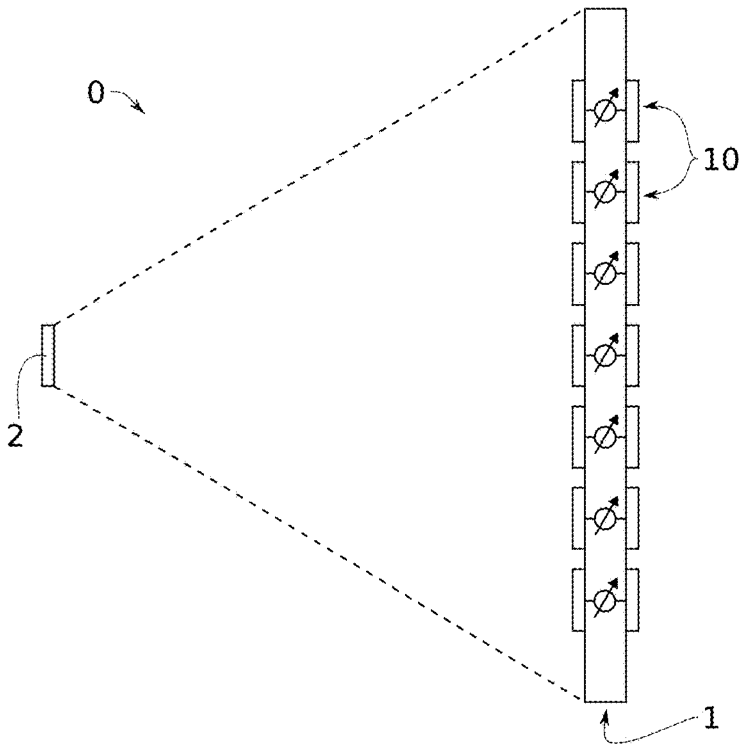
FIG. 1 schematically represents a profile, cross-sectional view of a transmit-array antenna according to an embodiment of the second aspect of the invention.

The drawings are given as examples and are not limiting of the invention. They constitute principle schematic representations intended to facilitate the understanding of the invention, and are not necessarily to the scale of practical applications. In particular, the relative thicknesses of the different layers illustrated in the drawings are not representative of reality.

DETAILED DESCRIPTION

Before starting a detailed review of embodiments of the invention, optional features are stated below, which can optionally be used in association or alternatively:

According to an example of the first aspect of the invention, the first substrate has a characteristic transverse dimension greater than or equal to 100 mm, even greater than or equal to 200 mm, and/or said at least one tile has a characteristic transverse dimension greater than or equal to 200 μm and strictly less than 50 mm, preferably less than 5 mm.

According to an example of the first aspect of the invention, each tile is fixed to the first substrate to form one single phase shift unit cell of the phase shift unit cell array.

According to an example of the first aspect of the invention, the vias associated with one another are electrically conductive with one another.

According to an example of the first aspect of the invention, the vias are constituted with the basis of a good electrically conductive material, such as copper, or are constituted with the basis of at least one stack of good electrically conductive materials, such as copper, gold and nickel.

According to an example of the first aspect of the invention, at least four, preferably at least sixteen, tiles are fixed on the first substrate, so as to give the form of a two-dimensional phase shift unit cell matrix to the phase shift unit cell array.

According to an example of the first aspect of the invention, for at least one, preferably for each, phase shift unit cell, the third metallisation level interconnects at least one pair of metal layers, a first metal layer of which extending from one of the vias through the tile of the phase shift unit cell considered, and a second metal layer extending from one of the vias through the first substrate associated with the tile of the phase shift unit cell considered.

According to an example of the first aspect of the invention, the third metallisation level interconnects at least two metal layers to one another, extending under two tiles which are adjacent to one another, with a metal layer extending over the first substrate. According to this example, it is possible to interconnect with one another, for example, in series, two tiles which are adjacent to one another, by interconnecting certain metal layers of said tiles which are adjacent to one another through a metal layer, extending over the first substrate.

According to an example of the first aspect of the invention, for at least one, preferably for each phase shift unit cell, at least one, preferably each, metal layer extending under the tile of the cell considered is connected to one of the metal layers extending over the first substrate through at least one metal pillar, for example, copper-based (and/or silver-based and/or tin-based).

According to the preceding example, the third metallisation level further comprises an underfill material arranged so as to consolidate the fixing of each tile to the first substrate, if necessary, the underfill material filling gaps between metal layers and/or gaps between metal pillars.

According to an example of the first aspect of the invention, alternative or complementary to the two preceding ones, for at least one, preferably for each, phase shift unit cell, the third metallisation level comprises a pair of two damascene levels, one extending over the first substrate and the other extending under the tile of the phase shift unit cell considered, the two damascene levels of each pair corresponding to one another, such that the fixing of the tile of the phase shift unit cell considered, that is done by direct bonding, silicon oxide being inserted between the metal layers which are connected to one another.

According to an example of the first aspect of the invention, at least one, preferably each, phase shift unit cell further comprises at least one phase change material switch formed at the third metallisation level.

According to the preceding example, at least one, preferably each, phase change material switch extends under at least one tile. According to this example, it is possible to test the switch before transferring the tile to which it is associated on the first substrate, so as to only transfer tiles associated with operational switches, and thus increase the manufacturing yield.

According to an example of the first aspect of the invention, the phase shift unit cell array has no silicon.

According to an example of the first aspect of the invention, said at least one tile and the first substrate are constituted with the basis of the same material chosen from among molten silica, quartz and a glass having a loss tangent less than 0.005 at frequencies greater than 100 GHz. Thus, being in the presence of materials with thermal dilation coefficients which are different from one another is avoided.

According to an example of the third aspect of the invention, each from among the first substrate and the second substrate has a characteristic transverse dimension greater than or equal to 100 mm, even greater than or equal to 200 mm, and/or said at least one tile has a characteristic transverse dimension greater than or equal to 200 μm and strictly less than 50 mm, preferably less than 5 mm.

According to an example of the third aspect of the invention, the first substrate and the second substrate are with the basis of the same material.

According to an example of the third aspect of the invention, the cutting is done around a unit cell.

According to an example of the third aspect of the invention, at least four, preferably at least sixteen, tiles are cut then transferred, such that the tiles form, with the parts of the first substrate onto which they are transferred, a phase shift unit cell array taking the form of a phase shift unit cell matrix.

According to an example of the third aspect of the invention, the method further comprises:

- providing at least one third substrate with the basis of one or the other from among molten silica, quartz and a glass having a loss tangent less than 0.005 at frequencies greater than 100 GHz, and comprising vias through the third substrate, and
- providing a second metallisation level located on the third substrate and a second half of the third metallisation level located under the third substrate, then,
- cutting at least one second tile into the third substrate, around a phase shift unit cell of the third substrate,
- transferring said at least one second tile onto the first substrate, such that at least one via through each second tile is associated with one of the vias through the first substrate, by being located to the right of one another, and such that the vias associated with one another interconnect the three metallisation levels to one another. Thus, the tiles can come from different substrates, and the latter can, for example, have thicknesses which are different to one another, such that the tiles which are cut there can be transferred onto one same first substrate for a phase shift unit cell array, the phase shift cells of which have thicknesses which are different to one another.

According to an example of the third aspect of the invention, the cutting of at least one, preferably each, tile comprises a cutting, for example, by laser or by saw, into the thickness of the substrate in question.

According to an example of the third aspect of the invention, for at least one, preferably for each, phase shift unit cell, the transfer of the first tile onto the first substrate is done through metal pillars, and further comprises the filling by an underfill material of the gaps between metal layers which constitute the three metallisation levels and/or between gaps between metal pillars.

According to an example of the third aspect of the invention, alternative or complementary to the preceding one, for at least one, preferably for each, phase shift unit cell, the transfer of the first tile onto the first substrate is done by direct bonding, the third metallisation level comprising a pair of two damascene levels, one extending over the first substrate and the other extending under the tile of the phase shift unit cell considered.

By a film or a layer with the basis of a material A, this means a film or a layer comprising this material A and optionally other materials.

By a parameter "substantially equal to/greater than/less than" a given value, this means that this parameter is equal to/greater than/less than the given value, plus or minus 20%, even 10%, of this value. By a parameter "substantially between" two given values, this means that this parameter is, as a minimum, equal to the smallest given value, plus or minus 20%, even 10%, of this value, and as a maximum, equal to the largest given value, plus or minus 20%, even 10%, of this value.

It is specified that, in the scope of the present invention, the terms "on", "under", "surmounts", "covers", "underlying" and their equivalents do not necessarily mean "in contact with". Thus, for example, the transfer, the application or the deposition of a first layer on a second layer, does not compulsorily mean that the two layers are directly in contact with one another, but means that the first layer at least partially covers the second layer, by being either directly in contact with it, or by being separated from it by at least one other layer or at least one other element.

In the description below, the substrate, film or layer thicknesses are generally measured along directions perpendicular to the main extension plane of the substrate, of the film, or of the layer.

Generally, phase change materials are materials which are capable of alternating, under the effect of a temperature variation, between a crystalline phase and an amorphous phase, the amorphous phase having an electrical resistance greater than that of the crystalline phase.

In the description below, the substrate, film or layer thicknesses are generally measured along directions perpendicular to the main extension plane of the substrate, of the film, or of the layer.

A first embodiment of the phase shift unit cell array 1 according to the first aspect of the invention is described below in reference to FIG. 3.

Figure 3:
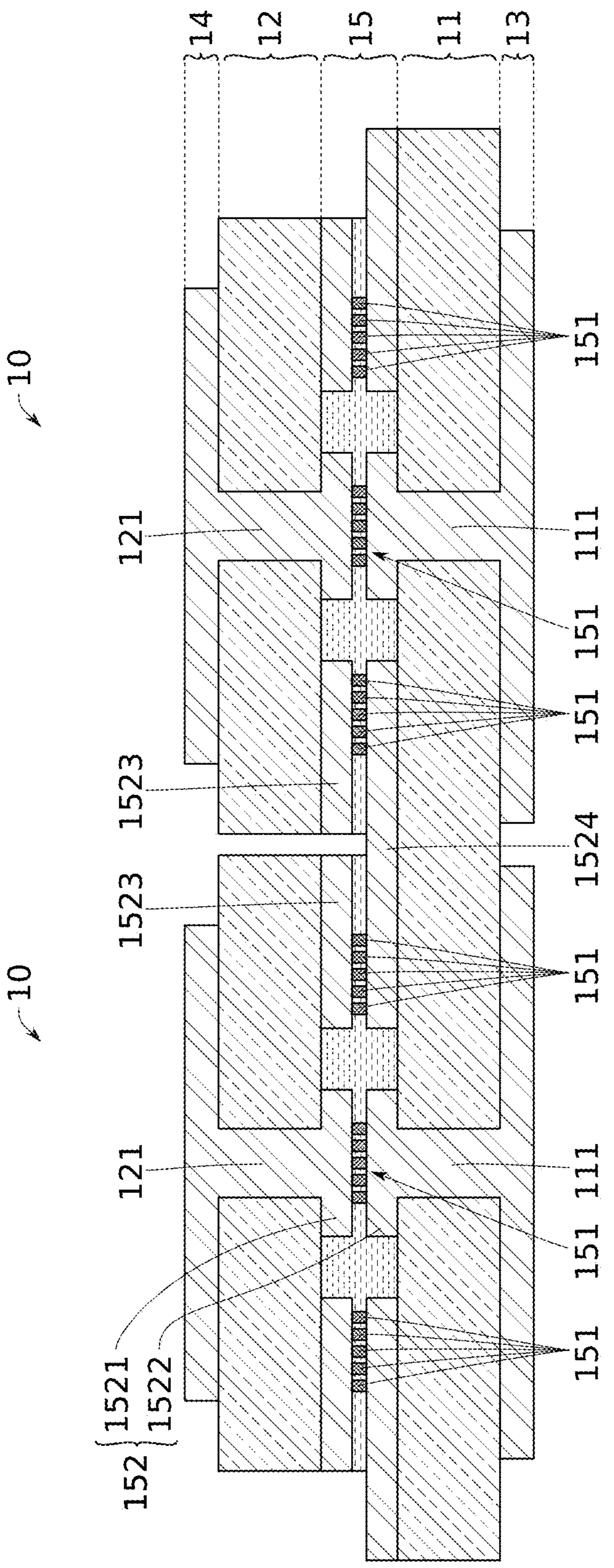
FIG. 3 schematically represents a cross-sectional view of a part of a phase shift unit cell array according to an embodiment of the first aspect of the invention.
Figure 10:
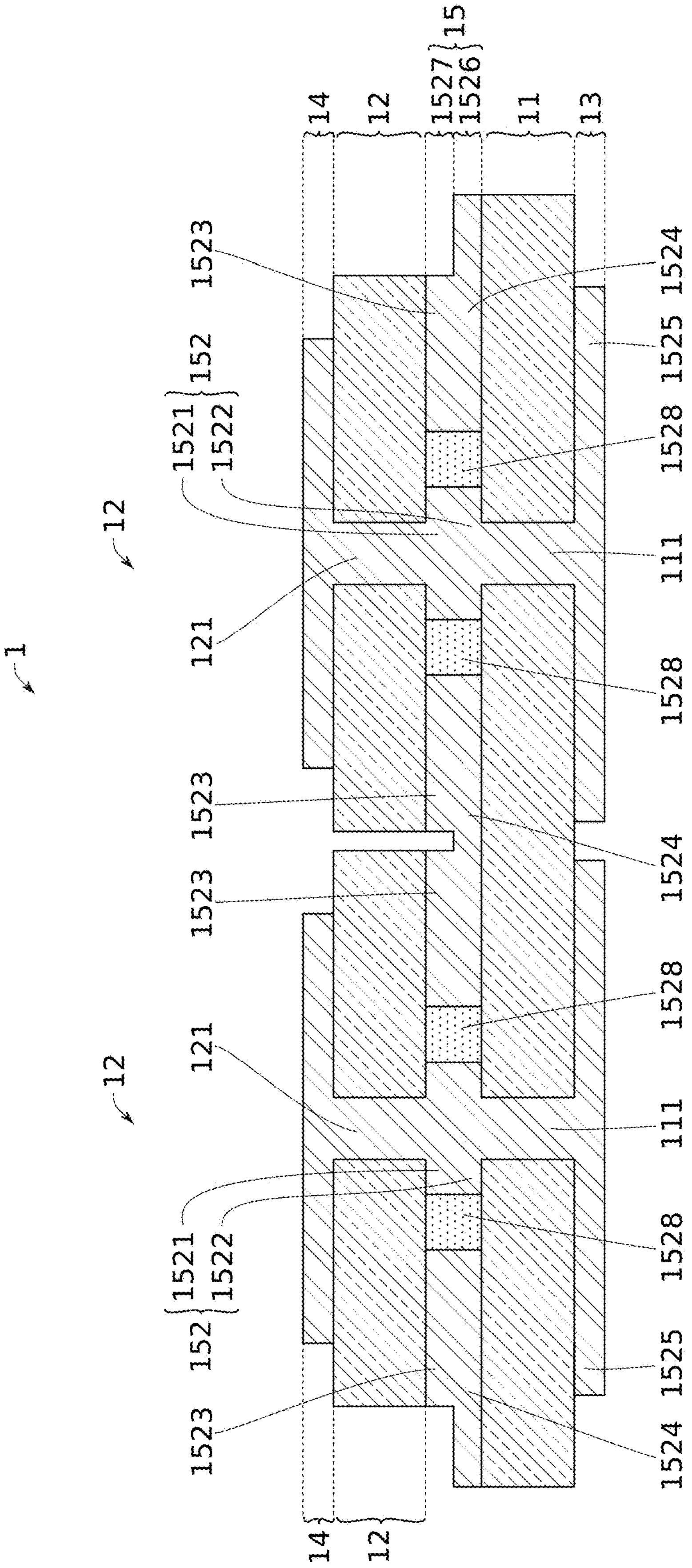
FIG. 10 schematically represents a cross-sectional view of a part of a phase shift unit cell array according to another embodiment of the first aspect of the invention relative to that illustrated in FIG. 3.
Figure 11:
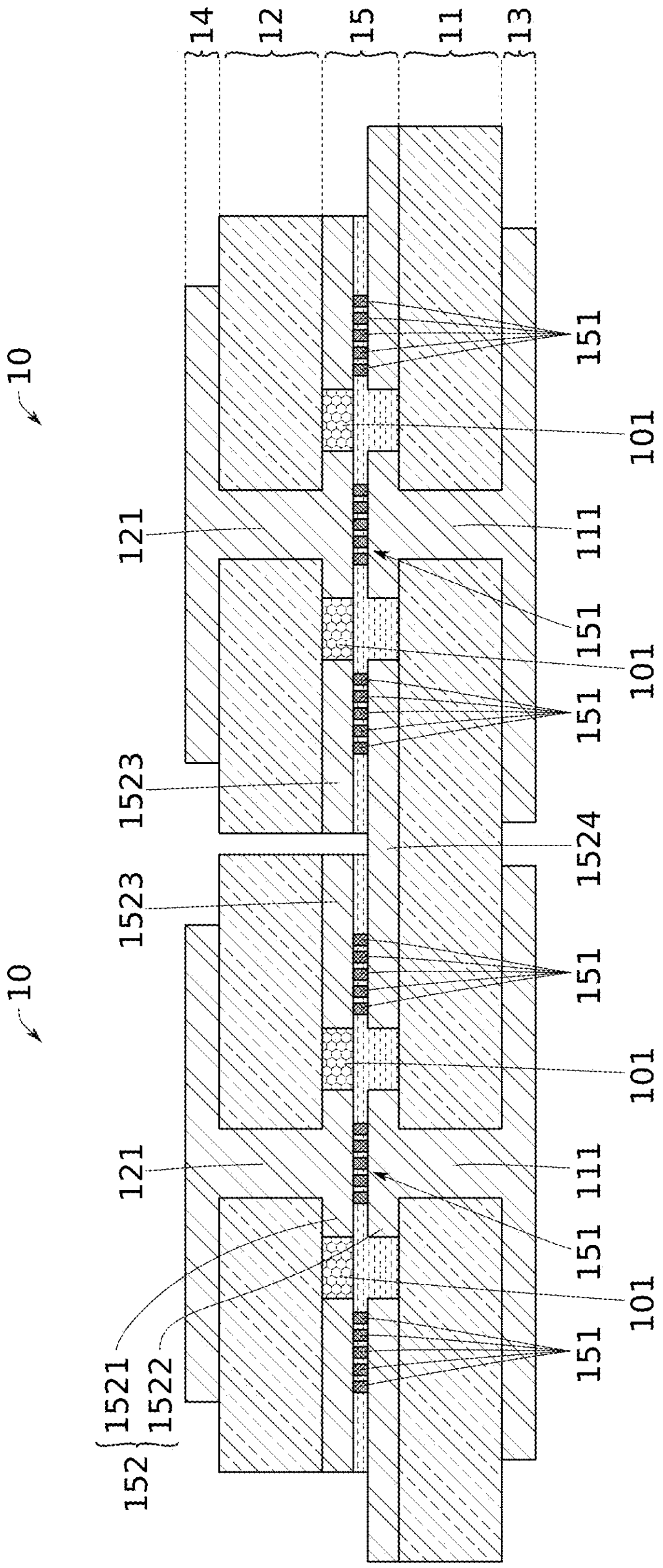
FIG. 11 schematically represents a cross-sectional view of a part of a phase shift unit cell array according to another embodiment of the first aspect of the invention relative to that illustrated in FIG. 3, and to that illustrated in FIG. 10.

The phase shift unit cell array 1 for a transmission antenna 0, such as illustrated in FIG. 3, but also such as illustrated in FIGS. 10 and 11, comprises:

- a first substrate 11 with the basis of one or the other from among molten silica and quartz and comprising a via matrix 111 through the first substrate 11,
- at least one tile 12, preferably coming from a cutting in a second substrate 21 with the basis of one or the other from among molten silica and quartz, comprising at least one via 121 through the tile 12, and.

three metallisation levels 13, 14, 15, of which a first metallisation level 13 located under the first substrate 11, a second metallisation level 14 located on each tile 12 and a third metallisation level 15 located between each tile 12 and the first substrate 11.

Each tile 12 is fixed on the first substrate 11 to form a phase shift unit cell 10 of the phase shift unit cell array 1, each via 121 through each tile 12 being possibly associated with one of the vias 111 through the first substrate 11 by being located to the right of one another, and the vias 111 and 121 associated with one another interconnect the three metallisation levels 13, 14, 15 to one another.

As illustrated in FIG. 11, each phase shift unit cell 10 can comprise at least one phase change material switch 101 formed at the third metallisation level 15.

The vias 111 and 121 can be constituted with the basis of a good electrically conductive material, such as copper. Alternatively, they can be constituted with the basis of at least one stack of good electrically conductive materials, such as copper, tin, silver or gold, for example, in the way described in the scientific article by Kim et al. which is referenced in the introduction.

More specifically, and as illustrated in FIGS. 3, 10 and 11, for at least one, preferably for each, phase shift unit cell 10, the third metallisation level 15 can make it possible to interconnect at least one pair of metal layers 152 of which a first metal layer 1521 extending from the via 121 through the tile 12 of the phase shift cell 10 considered and a second metal layer 1522 extending from the via 111 through the first substrate 11 which is associated with the tile 12 of the phase shift cell 10 considered.

Alternatively or complementarily, and always as illustrated in FIGS. 3, 10 and 11, the third metallisation level 15 can make it possible to interconnect with one another, at least two metal layers 1523 extending under two tiles 12 adjacent to one another with a metal layer 1524 extending over the first substrate 11. It is thus possible to interconnect with one another, for example in series, two adjacent tiles 12 by interconnecting certain metal layers 1523 of said tiles 12 adjacent to one another through a metal layer 1524 extending over the first substrate 11.

Figure 4A:
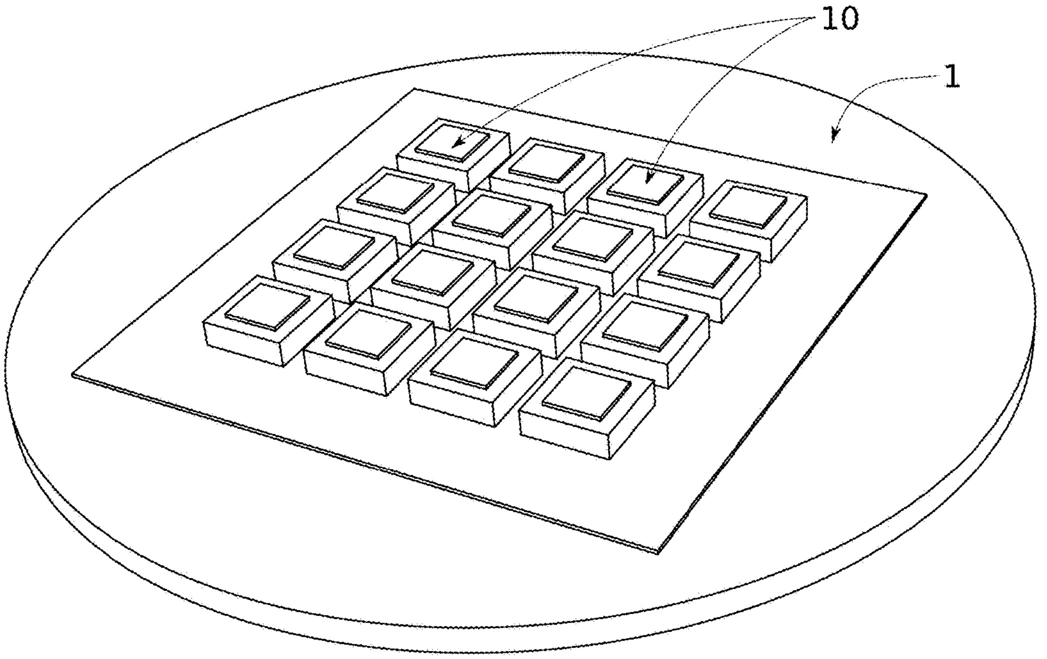
FIG. 4A represents a perspective and transparent view of a phase shift cell array according to an embodiment of the first aspect of the invention.
Figure 4B:
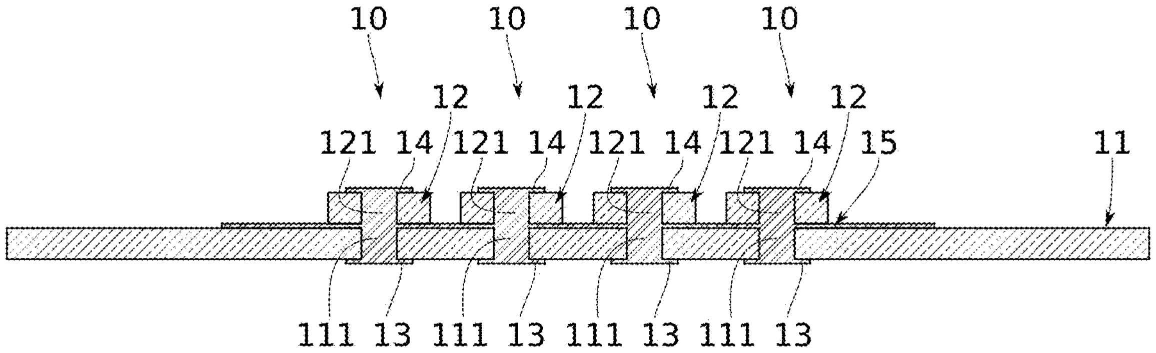
FIG. 4B schematically represents a profile and transparent view of the phase shift cell array illustrated in FIG. 4A.
Figure 5:
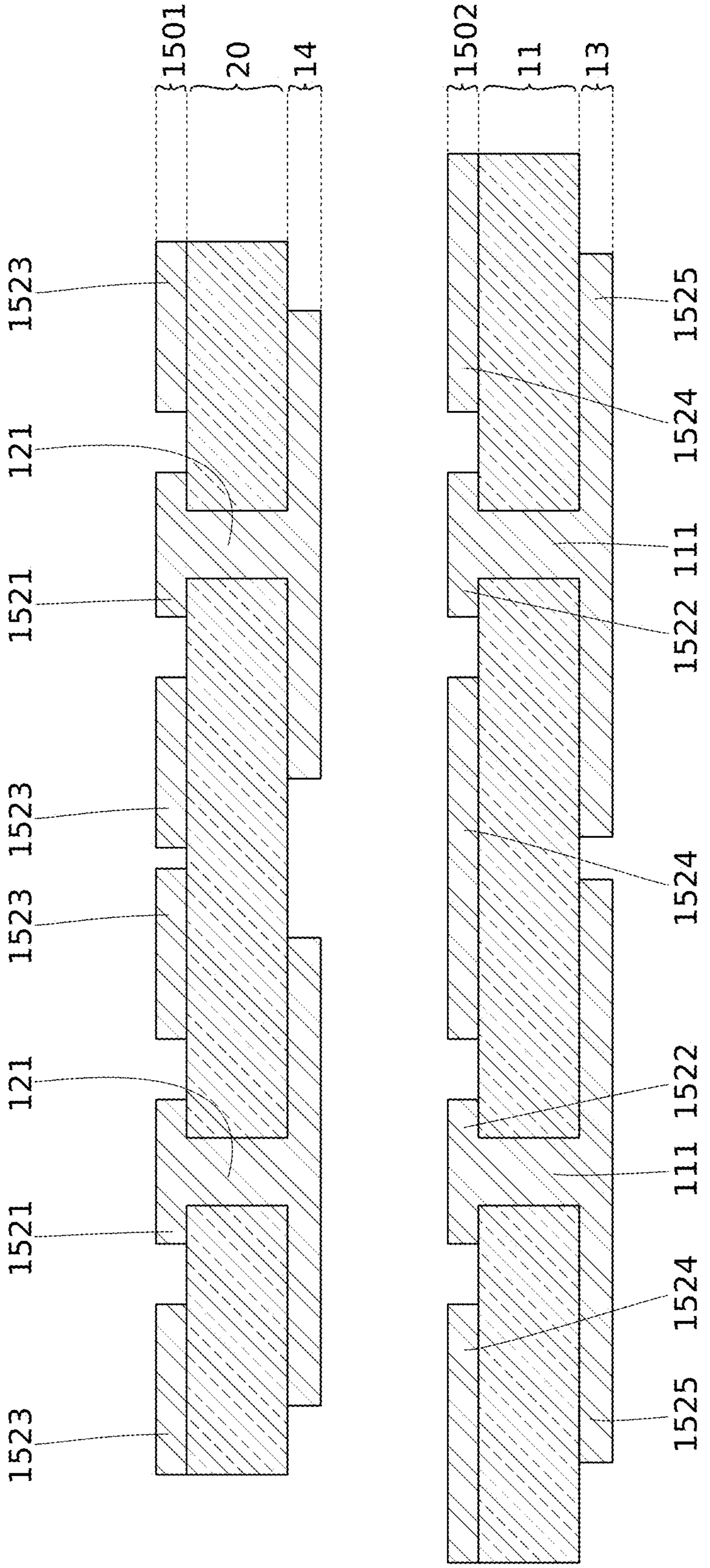
FIGS. 5 to 9 schematically represent steps of an embodiment of the method for manufacturing the part of the phase shift unit cell array which is illustrated in FIG. 3.

The schematic representation that FIG. 3 offers is only partial. All of the phase shift unit cell array 1 is itself illustrated in FIGS. 4A and 4B which show an organisation in matrix form of 4*4 phase shift unit cells 10. The nature, for example square, of the two-dimensional matrix, as well as the number of phase shift cells 10 that it can comprise, are however not limited to the example illustrated in FIGS. 4A and 4B.

An embodiment of the manufacturing method according to the 2$^{nd}$ aspect of the invention is illustrated in FIGS. 5 to 9 which results in the embodiment of the phase shift unit cell array 1 which is illustrated in FIG. 3.

Figure 9:
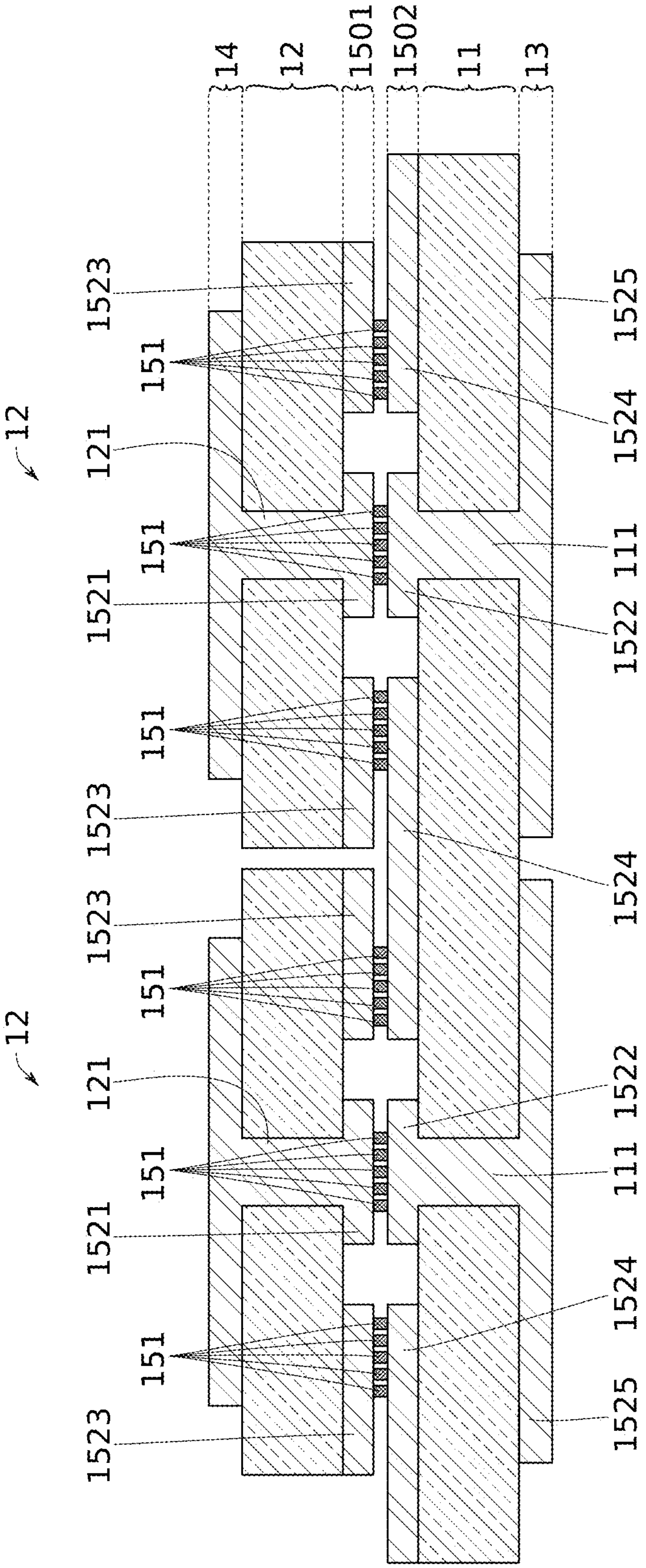

The manufacturing method according to the embodiment illustrated in FIGS. 5 to 9 is mainly such that it comprises:

providing a first substrate 11 with the basis of one or the other from among molten silica and quartz and comprising a via matrix 11 through the first substrate 11 (see FIG. 5), providing a second substrate 20 with the basis of one or the other from among molten silica and quartz and comprising a via matrix 121 through the second substrate 20 (see FIG. 5), providing a first metallisation level 13 located under the first substrate 11 and a first half 1501 of a third metallisation level 15 located on the first substrate 11 (see FIG. 5), providing a second metallisation level 14 located on the second substrate 20 and a second half 1502 of the third metallisation level 15 located under the second substrate 20 (see FIG. 5), then cutting at least one first tile 12 in the second substrate 20, around one of the vias 121 or more generally, around a phase shift unit cell of the second substrate 20 (see FIGS. 7 and 8), transferring said at least one first tile 12 onto the first substrate 11 (see FIG. 9).

In this way, the via(s) 121 through each first tile 12 are possibly associated with one or more via(s) 111 through the first substrate 11, by being located to the right of one another, and the vias 111 and 121 associated with one another interconnect the three metallisation levels 13, 14, 15 with one another.

More specifically, the steps of providing the first substrate 11 and the second substrate 20 can be such as described in the scientific article by R. Bowrothu et al., referenced in the introduction.

It is noted that the cutting is preferably done around one single phase shift unit cell of the second substrate 20. Alternatively, it is possible to transfer a plurality of tiles 12, for example, forming a 2*2 or 4*4 matrix, or more, and not necessarily square, by cutting the second substrate 20 around this plurality. Each cutting is, for example, done using a laser or a saw. It preferably takes effect in the thickness of the second substrate 20, the laser being, for example, held perpendicular to a main extension surface of the second substrate 20 during each cutting.

Figure 6:
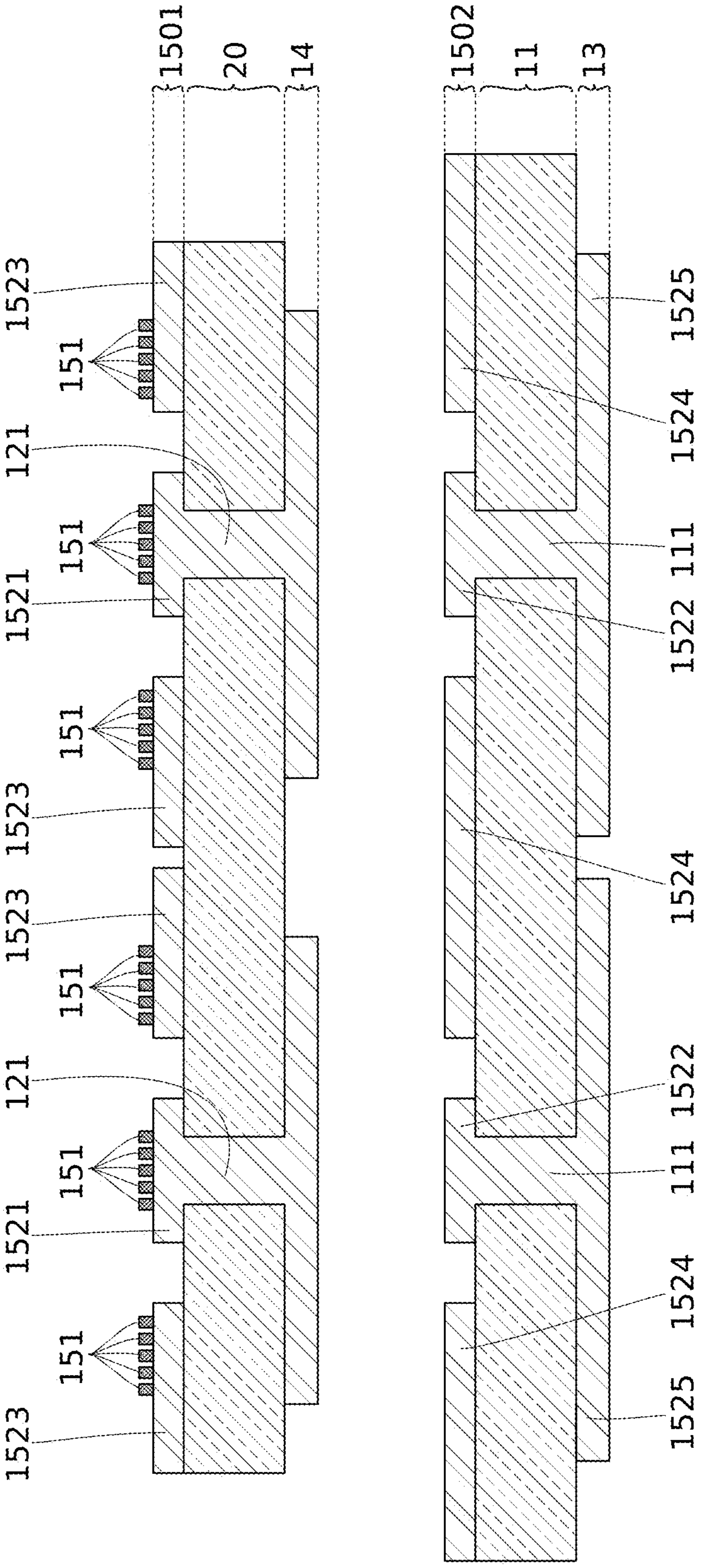
Figure 7:
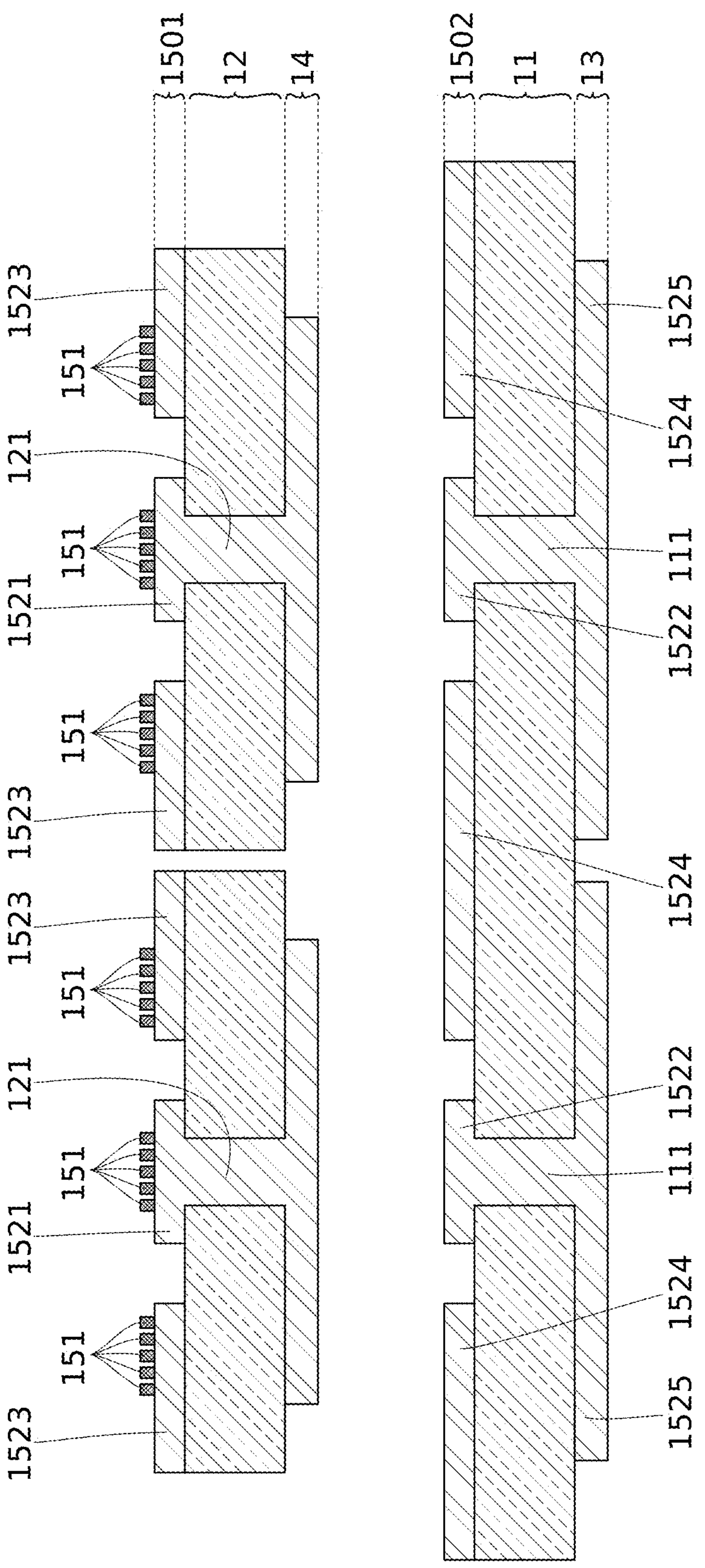
Figure 8:
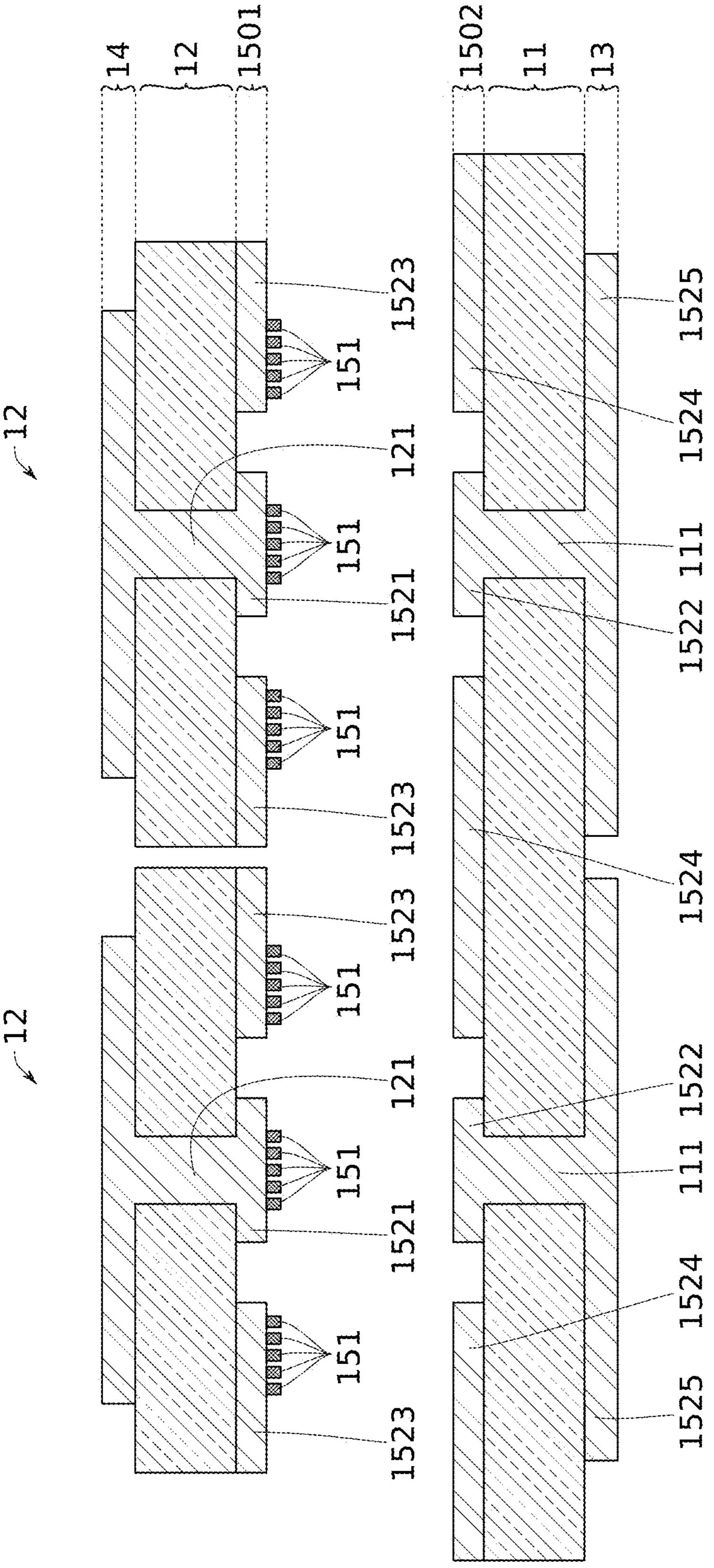

In reference to FIG. 6, the manufacturing method according to the embodiment illustrated, can more specifically be such that, for at least one, preferably for each, phase shift unit cell 10, the transfer of the first tile 12 onto the first substrate 11 is done through metal pillars 151. The manufacturing method can thus further comprise, from the illustration that FIG. 9 offers, the filling by an underfill material of the gaps between metal layers 1521, 1522, 1523, 1524 which constitute the three metallisation levels 13, 14, 15 and/or between gaps between metal pillars 151, in the way illustrated in FIG. 3.

Thus, as illustrated in FIG. 3, for at least one, preferably for each, phase shift unit cell 10, at least one, preferably each, metal layer 1521, 1523 extending under the tile 12 of the cell 10 considered can be connected to one of the metal layers 1522, 1524 extending over the first substrate 11 through at least one metal pillar 151, for example, copper-based.

Furthermore, as always illustrated in FIG. 3, the third metallisation level 15 can comprise an underfill material 153 arranged so as to consolidate the fixing of each tile 12 to the first substrate 11, if necessary, the underfill material 153 filling gaps between the metal layers 1521, 1522, 1523, 1524 and/or gaps between metal pillars 151.

Alternatively to the embodiment illustrated in FIG. 3, the embodiment illustrated in FIG. 10 is such that, for at least one, preferably for each, phase shift unit cell 10, the third metallisation level 15 comprises a pair of two damascene levels. A first damascene level 1526 thus extends over the first substrate 11 and a second damascene level 1527 thus extends under the tile 12 of the phase shift cell 10 considered. Preferably, the two damascene levels 1526, 1527 of each pair correspond to one another. In this way, the fixing of the tile 12 of the phase shift unit cell 10 considered is done by direct bonding. Silicon oxide 1528 is thus, if necessary, inserted between the gaps of the metal layers 1521, 1522, 1523, 1524 which are connected to one another.

Preferably, at least one, even each, tile 12 and the first substrate 11 are constituted with the basis of one same material chosen from among molten silica and quartz. Being in the presence of materials with thermal dilation coefficients which are different to one another is thus avoided, which reduces the risks of the array breaking, in particular during steps of integrating said array into a transmission antenna 0.

Figure 2:
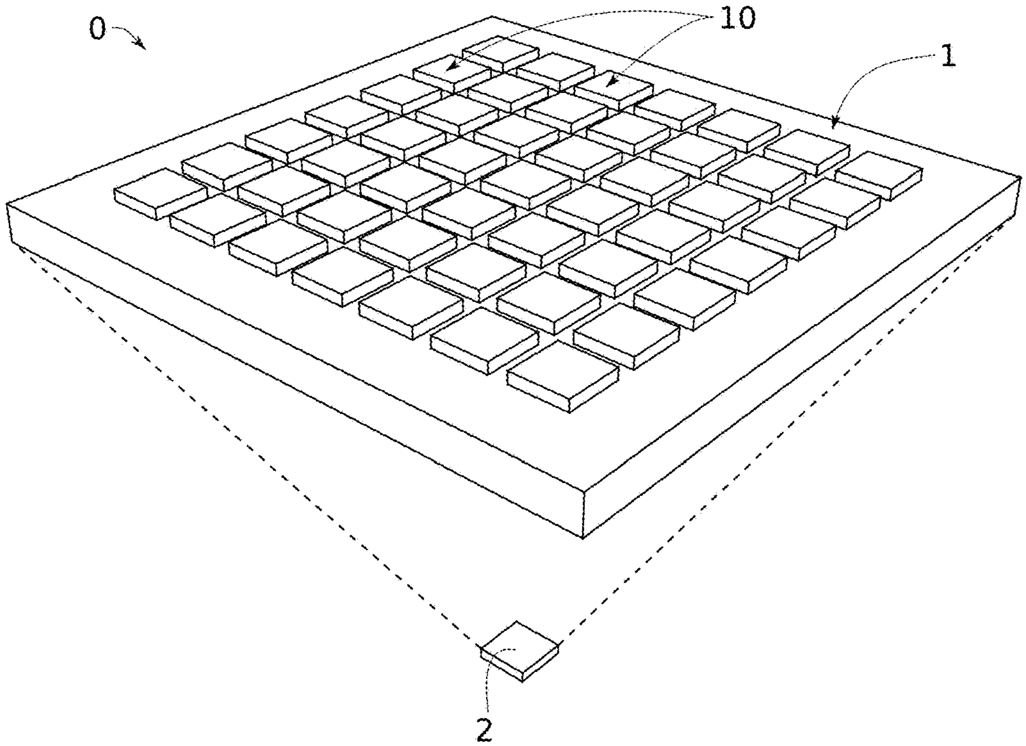
FIG. 2 schematically represents a perspective view of a transmit-array antenna according to an embodiment of the second aspect of the invention.

Such a transmission antenna 0 is illustrated in FIGS. 1 and 2. It comprises, in addition to the phase shift unit cell array 1 according to the first aspect of the invention, at least one primary source 2 connected electromagnetically to said phase shift unit cell array 1.

In a way not illustrated in the figures, a person skilled in the art will understand that it is possible that certain tiles 12 to be transferred onto the first substrate 11 do not come from the second substrate 20, but from a third substrate having, for example, a thickness different from that of the second substrate 20, and more specifically, a layer with the basis of one from among molten silica and quartz having a thickness different from that of the second substrate 20. Thus, the tiles 12 can come from different substrates, and the latter can, for example, have thicknesses which are different to one another, such that the tiles 12 which are cut there can be transferred onto one same first substrate 11 for a phase shift unit cell array 1 of which the phase shift unit cells 10 have thicknesses which are different to one another.

The invention, according to each of its different aspects, can thus consist of, or result in, a first substrate 11 on which is fixed by pieces, or equivalently by tiles 12, a second substrate 20 in which the pieces of tiles 12 have been cut. Thus, advantageously, it is avoided to have to transfer a substrate onto another substrate, thus relaxing the flatness stresses of the assembly surfaces, and/or decreasing the risk of the substrates breaking during their handling and/or their manufacture, when they are subjected to thermomechanical stresses.

The invention is not limited to the embodiments described above, and extends to all the embodiments covered by the invention.

The invention claimed is:

1. A phase shift unit cell array for a transmit-array antenna, comprising:

a first substrate based upon one of molten silica, quartz and a glass having a loss tangent less than 0.005 at frequencies greater than 100 GHz, vias disposed through the first substrate, at least two tiles coming from a cutting in a second substrate based upon one of molten silica, quartz and a glass having a loss tangent less than 0.005 at frequencies greater than 100 GHz, at least one via disposed through each tile, and three metallisation levels comprising a first metallisation level located under the first substrate, a second metallisation level located on each tile and a third metallisation level located between each tile and the first substrate, each tile being fixed on the first substrate to form a phase shift unit cell of the phase shift unit cell array, at least one via through each tile being associated with one of the vias through the first substrate by being located to the right of one another, and the vias associated with one another interconnecting the three metallisation levels with one another and each tile having a different thickness.

2. The phase shift unit cell array according to claim 1, wherein at least four tiles are fixed on the first substrate so as to give to the phase shift unit cell array a form of a two-dimensional phase shift unit cell matrix.

3. The phase shift unit cell array according to claim 1, wherein, for at least a first phase shift unit cell, the third metallisation level interconnects at least one pair of metal layers of which a first metal layer extends from one of the vias through the tile of the first phase shift unit cell and a second metal layer extends from one of the first vias through the first substrate which is associated with the tile of the first phase shift unit cell.

4. The phase shift unit cell array according to claim 1, wherein the third metallisation level interconnects with one another, at least two metal layers extending under two tiles adjacent to one another with a metal layer extending over the first substrate.

5. The phase shift unit cell array according to claim 4, wherein, for at least a second phase shift unit cell, at least one metal layer extending under the tile of the second phase shift unit cell is connected to one of the metal layers extending over the first substrate through at least one metal pillar.

6. The phase shift unit cell array according to claim 5, wherein the third metallisation level further comprises an underfill material arranged so as to consolidate fixing of each tile to the first substrate, the underfill material filling gaps between metal layers and/or gaps between metal pillars.

7. The phase shift unit cell array according to claim 3, wherein, for at least a third phase shift unit cell, the third metallisation level comprises a pair of two damascene levels, one extending over the first substrate and the other extending under the tile of the third phase shift unit cell, the two damascene levels of each pair corresponding to one another, such that fixing of the tile of the third phase shift unit cell is done by direct bonding, silicon oxide being inserted between the metal layers which are connected to one another.

8. The phase shift unit cell array according to claim 1, wherein at least one phase shift unit cell further comprises at least one phase change material switch formed at the third metallisation level.

9. The phase shift unit cell array according to claim 8, wherein the at least one phase change material switch extends under at least one tile.

10. The phase shift unit cell array according to claim 1, wherein the at least one of the at least two tiles and the first substrate are based upon a same material chosen from among molten silica, quartz and a glass having a loss tangent less than 0.005 at frequencies greater than 100 GHz.

11. A transmit-array antenna comprising the phase shift unit cell array according to claim 1 and a primary source connected electromagnetically to the phase shift unit cell array.

12. A method for manufacturing a phase shift unit cell array for a transmit-array antenna, comprising:

providing a first substrate based upon one of molten silica, quartz and a glass having a loss tangent less than 0.005 at frequencies greater than 100 GHz, vias disposed through the first substrate, providing a second substrate based upon one of molten silica, quartz and a glass having a loss tangent less than 0.005 at frequencies greater than 100 GHz, vias disposed through the second substrate, providing a first metallisation level located under the first substrate and a first half of a third metallisation level located on the first substrate, providing a second metallisation level located on the second substrate and a second half of the third metallisation level located under the second substrate, then cutting at least one first tile in the second substrate, the at least one first tile comprising at least one of the vias of the second substrate, and transferring the at least one first tile onto the first substrate, such that at least one via through each first tile is associated with one of the vias through the first substrate, by being located to the right of one another, wherein the vias associated with one another interconnect the three metallisation levels with one another.

13. The manufacturing method according to claim 12, wherein at least four tiles are cut and then transferred, such that the tiles form, with parts of the first substrate onto which the tiles are transferred, a phase shift unit cell array taking a form of a phase shift unit cell matrix.

14. The manufacturing method according to claim 12, comprising:

providing at least one third substrate based upon one of molten silica, quartz and a glass having a loss tangent less than 0.005 at frequencies greater than 100 GHz, and comprising vias through the third substrate, providing a second metallisation level located on the third substrate and a second half of the third metallisation level located under the third substrate, then, cutting at least one second tile in the third substrate, around a phase shift unit cell of the third substrate, and transferring the at least one second tile onto the first substrate, wherein at least one via through each second tile is associated with one of the vias through the first substrate, by being located to the right of one another, and such that the vias associated with one another interconnect the three metallisation levels with one another.

15. The method according to claim 12, wherein, for at least one phase shift unit cell, the transfer of the first tile onto the first substrate is done through metal pillars, and further comprises filling by an underfill material of gaps between metal layers which constitute the three metallisation levels and/or between gaps between metal pillars.

16. The method according to claim 12, wherein, for at least one phase shift unit cell, the transfer of the first tile onto the first substrate is done by direct bonding, the third metallisation level comprising a pair of two damascene levels, one extending over the first substrate and the other extending under the tile of the at least one phase shift unit cell.

* * * * *